May 22, 1956  O. J. POUPITCH  2,746,065
METHOD OF MAKING PREASSEMBLED WASHERS AND ROTARY FASTENERS
Filed March 24, 1953
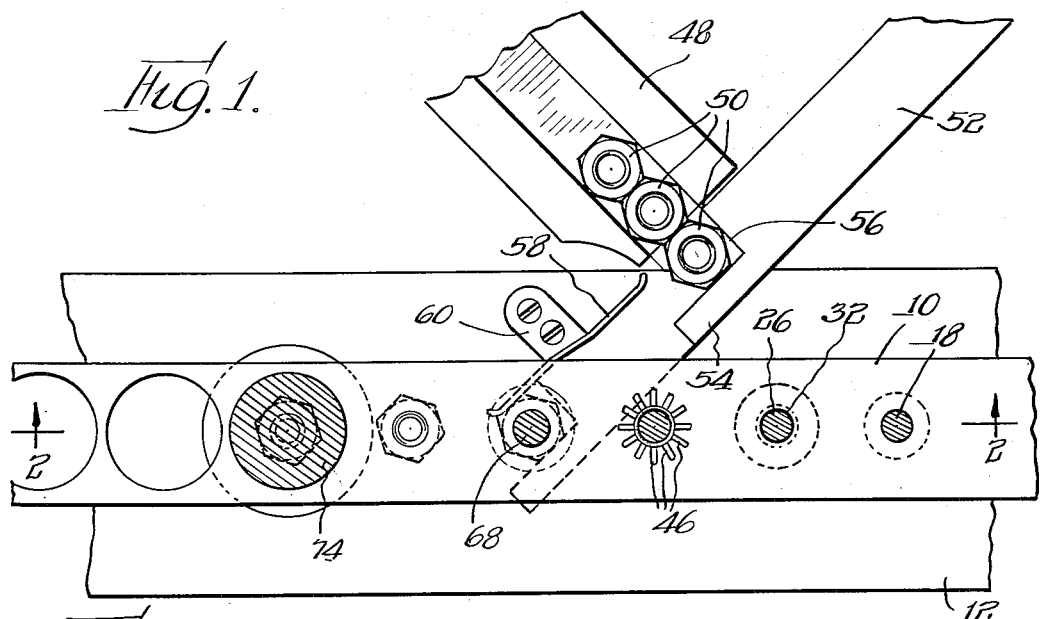
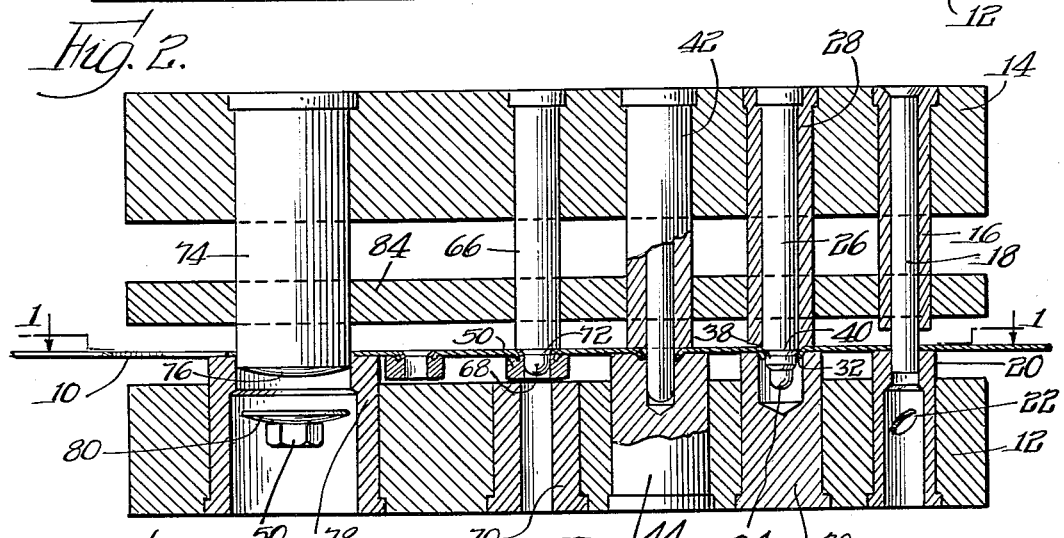
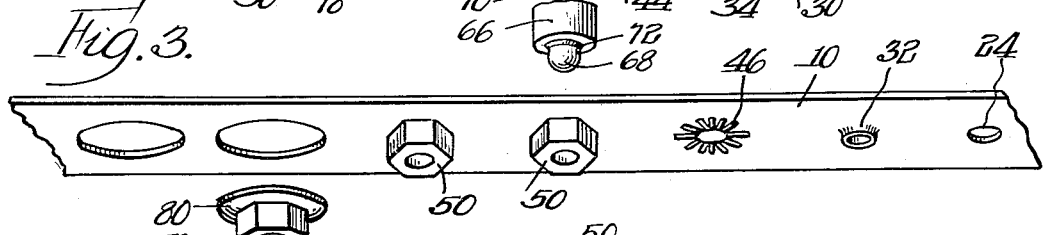
INVENTOR.
Ougljesa Jules Poupitch
BY
Moore, Olson & Trexler
attys.

United States Patent Office 2,746,065
Patented May 22, 1956

2,746,065

METHOD OF MAKING PREASSEMBLED WASHERS AND ROTARY FASTENERS

Ougljesa Jules Poupitch, Itasca, Ill., assignor to Illinois Tool Works, Chicago, Ill., a corporation of Illinois Application March 24, 1953, Serial No. 344,310

1 Claim. (Cl. 10—86)

This invention is concerned generally with a method of assembling rotary fasteners and lockwashers, and more particularly with a method of manufacturing preassembled rotary fasteners and lockwashers.

Heretofore, in the manufacture of preassembled lockwashers and rotary fasteners such as nut elements or screw elements, it has been the general practice to start the assembly operation with washers that are completed or substantially completed. Thus, in many instances completely formed loose or discrete washers have been fed from a hopper to an assembly station for assembly with rotary fasteners. In other instances, washers in strip form and each complete except for the interconnections necessary to maintain the washers in the strip, have been fed from a storage roll to an assembly station for assembly with rotary fasteners.

Both of these general methods require a step of storing or handling the completed or substantially completed washers. This step is inevitable when the assembling is to be done at a location remote to the location at which the washers are formed. However, handling of certain types of washers is difficult and the extra storage or handling step heretofore set forth is always time and space consuming, all of which leads to slower and more expensive production.

The primary object of this invention is to provide a method of manufacturing preassembled washers and rotary fasteners with the utmost simplicity and with a minimum number of steps.

An object of this invention is to provide a method of forming washers and assembling them with rotary fasteners in the same operation or operational sequence.

A further object of this invention is to provide a method of assembling rotary fasteners with washers as an integral step in the manufacture of the washers.

Another object of this invention is to provide a method of manufacturing preassembled washers and rotary fasteners wherein rotary fasteners are permanently assembled with sheet stock prior to the formation of washers from said sheet stock.

This invention contemplates the provision of a method of manufacturing preassembled washers and rotary fasteners by operating on a strip of sheet metal stock successively to form apertures defining the inner margins of washers, permanently telescoping rotary fasteners in the apertures, and then forming the exterior outline of the washers simultaneously to complete the washers and to detach the completed assemblies from the strip. The successive operations conveniently can be carried out in a punch press during a single pass of the strip stock through the press.

Other and further objects and advantages of the present invention will be apparent from the ensuing description when taken in connection with the accompanying drawings, wherein:

Fig. 1 is a top view showing a strip of sheet stock being operated on according to the principles of my invention and taken along the line 1—1 of Fig. 2;

Fig. 2 is a longitudinal sectional view taken along the line 2—2 of Fig. 1;

Fig. 3 is a perspective view on an enlarged scale of the strip illustrating the various manufacturing steps; and Fig. 4 is a cross sectional view of a completed assembly comprising a nut and washer.

Referring in greater particularity to the drawings for an illustrative example of my invention there will be seen an elongated strip 10 of sheet stock which is fed from any convenient source, such as a storage roll (not shown) by any convenient means (not shown). The strip 10 can be of a soft or pre-temperate stock and the assembled units can be heat treated at a later stage to harden the washers produced from the soft strip. The strip can be pre-coated or pre-plated to resist corrosion for other reasons, the pre-coating or pre-plating leading to economy of manufacture over production methods requiring coating or plating of finished washers.

The strip 10 preferably is fed through a punch press of conventional construction having a bed 12 and a head or punch carrier 14 reciprocable toward and away from the bed. It will be understood that the strip 10 is fed intermittently in timed relation with the reciprocation of the head or punch carrier 14 as is the usual case in the operation of punch presses.

The head 14 carries a sleeve 16 in which is mounted a cylindrical punch 18 cooperable with a complementary die carried by the bed 12 for stamping out circular slugs 22 from the strip 10 to leave circular apertures 24 destined to become washer center holes.

The apertured strip is fed from the first station to a second station whereat a punch 26 mounted in a sleeve 28 carried by the head 14 is cooperable with a die 30 to extrude a frusto-conical flange or skirt 32 around each aperture 24. To this end the punch 26 is provided with a rounded tip 34 for relatively centralizing the strip and punch, and a frusto-conical shoulder 40 of slightly larger diameter than the apertures 24 tapering outwardly at 38 to a larger frusto-conical shoulder 40 which shapes the skirt 32 against a complementary bevelled edge on the die 30.

At the next stage a cooperating punch 42 and die 44 respectively carried by the head 14 and bed 12 form radial serrations 46 extending outwardly in the strip 10 from the aperture 24. These serrations may take the form of radial slits with the intervening material twisted or otherwise deformed from the plane of the strip for improved locking action.

The strip 10 then is fed on to the next station whereat the next succeeding step of staking nut elements to the strip is performed. An inclined nut feeding chute 48 feeds nut elements 50 from a suitable source such as a hopper to a position adjacent the edge of the bed 12. A transfer slide 52 having a positioning finger 54 and shoulder 56 is reciprocable in timed relation to the operation of the punch press and the feeding of the strip from the discharge end of the chute 48 to a position beneath the strip 10 and aligned with the successive apertures therein. A spring metal guide 58 is mounted on the bed 12 by a bracket 60 in opposition to the finger 54 for accurate positioning of the nut elements 50 in line with the apertures 24. The nut elements are of the type having an axially extending stub shaft 62 (Fig. 4) surrounded by a bevelled edge annular groove 64 adapted to receive a washer flange or skirt. The strip 10 which raises somewhat from the position shown in Fig. 2 with each upward reciprocation of the head 14 and dies drops down with a flange or skirt 32 received in the annular groove 64 of a properly positioned nut element 48. A punch 66 carried by the head 14 and having a rounded centering tip 68 forces the strip 10 and nut element 50 down against a die or anvil 70. A frusto-conical section 72 on the die 66 surrounding the tip 68 swages the stub shaft 62 of the nut element outwardly to swage the stub shaft outwardly to the position shown in Fig. 4, thereby trapping each nut element on the strip, but free for rotation thereon.

The assembled strip and nut elements then are fed on to a final station where the washers and assemblies are completed concurrently. A die 74 carried by the head 14 is provided and has a diameter equal to that of the desired washer. The bottom end 76 of the die 74 is convex in configuration and deforms the strip section surrounding each nut element to a concave-convex configuration before shearing such sections from the strip against a die 78 concurrently to separate washers 80 from the strip and to complete the nut element and washer assemblies 82 which drop gravitationally to any suitable conveyor or container.

A stripper plate 84 is provided above the bed 12 to strip the stock strip 10 from the ascending dies according to the usual punch press practice. A suitable spring pressed carrier (not shown) is provided for urging the strip 10 toward the plate 84 in the vicinity of the punch 74 and die 78 to carry the nut elements above the die 78. Insofar as my method is concerned, any other suitable means such as magnetic means attracting the strip 10 toward the plate 84 or means for reciprocating the die 78 may be employed for moving the nut elements past the die 78.

It will be apparent that I have herein disclosed means capable of carrying out a superior method of producing preassembled nut elements and washers. This method affords great economy, limits the number of operations necessary to make an assembled unit, and simplifies handling since no washer ever need be formed or individually handled prior to assembly with nut elements.

Although I have illustrated my method with regard to nut elements and concave-convex washers, it is apparent that the invention is equally applicable to other types of rotary fasteners and washers. Other and further modifications of the illustrative example are possible and come within the purview of my invention insofar as they fall within the spirit and scope of the appended claim.

I claim:

The method of forming washers and coupling the same in preassembled relation with rotary fasteners having clamping faces with projections extending axially therefrom, which method comprises feeding a strip of material intermittently past a series of work stations and at the said work stations successively performing the steps of punching the strip to provide apertures therein, forming a frusto-conical flange around each aperture, radially serrating each frusto-conical flange, telescopically associating a rotary fastener with each frusto-conical flange and with the axial projection on the fastener projecting through the aperture in a direction opposite to the direction in which the flange extends from the strip, swaging each projection on the rotary fastener to cooperate with the flange to trap each rotary fastener on the strip, centering each trapped rotary fastener with respect to a cupping and punching die, and finally cupping the strip away from the rotary fastener and blanking the cupped portion from the strip to provide the preassembled washer and rotary fastener.

References Cited in the file of this patent

UNITED STATES PATENTS

| | | |
|---|---|---|
| 978,924 | Neider | Dec. 20, 1910 |
| 1,119,553 | Vaughan | Dec. 1, 1914 |
| 1,268,862 | MacMillan | June 11, 1918 |
| 1,650,525 | Krain | Nov. 22, 1927 |
| 1,730,377 | Northrup | Oct. 8, 1929 |
| 2,307,132 | Hufferd | Jan. 5, 1943 |
| 2,321,155 | Poupitch | June 8, 1943 |
| 2,619,146 | Poupitch | Nov. 25, 1952 |
| 2,646,613 | Enzler | July 28, 1953 |
| 2,681,678 | Hage | June 22, 1954 |